United States Patent [19]

Damson et al.

[11] Patent Number: 4,506,186

[45] Date of Patent: Mar. 19, 1985

[54] SPARK PLUG AND OPTICAL COMBUSTION SENSOR COMBINATION

[75] Inventors: Eckart Damson, Stuttgart; Winfried Moser, Markgröningen; Klaus Müller, Tamm; Franz Rieger, Aalen; Rainer Schübler, Bietigheim, all of Fed. Rep. of Germany

[73] Assignee: Robert Bosch GmbH, Stuttgart, Fed. Rep. of Germany

[21] Appl. No.: 427,181

[22] Filed: Sep. 29, 1982

[30] Foreign Application Priority Data

Nov. 28, 1981 [DE] Fed. Rep. of Germany ....... 3147290

[51] Int. Cl.³ ........................................... H01T 13/48
[52] U.S. Cl. .................................... 313/129; 313/144
[58] Field of Search ............... 313/129, 141, 118, 136, 313/11.5, 144; 350/96.1

[56] References Cited

U.S. PATENT DOCUMENTS 2,798,980 7/1957 Beardslee, Jr. ................ 313/11.5 X
4,393,687 7/1983 Müller et al. .................... 313/129 X

FOREIGN PATENT DOCUMENTS 1815697 2/1973 Fed. Rep. of Germany .

Primary Examiner—David K. Moore
Assistant Examiner—K. Wieder
Attorney, Agent, or Firm—Frishauf, Holtz, Goodman & Woodward

[57] ABSTRACT

To facilitate assembly of a central glass rod in an optical sensor-spark plug combination, electrical energy is conducted to the spark end of the combination by a high temperature resistant tube or sleeve 11 surrounding a central glass rod 2 for only a limited portion of the entire length; electrical energy is conducted to the high temperature resistant sleeve 11, which forms the sparking end of the spark plug, from a terminal connector 1 by a packing 10 of electrically conductive powder, which may include radio noise suppression resistance characteristics, held in place by a compression spring 8, in electrical connection with the terminal connector 1; or by a separate tube 12 surrounding the glass rod 1, and of non-heat resistant material, the glass rod 1 being separated from the other tube 12 by an adhesive which, at the connecting end of the spark plug, need not be high temperature resistant.

19 Claims, 2 Drawing Figures

SPARK PLUG AND OPTICAL COMBUSTION SENSOR COMBINATION

Reference to related application assigned to the assignee of this invention, the disclosure of which is hereby incorporated by reference:

U.S. Ser. No. 214,481, Filed Dec. 9, 1980 now U.S. Pat. No. 4,393,687, issued July 19, 1983, Müller et al.

U.S. Ser. No. 428,003, Filed Sept. 29, 1982, Damson et al.; Title: COMBINATION SPARKING AND COMBUSTION PROCESS SENSOR, Claiming priority German Pat. No. 31 47 291.5, Reference to related Art, German Patent Disclosure Document DE-OS No. 18 15 697, Webb et al Claiming priority U.S. Ser. No. 692,528, Dec. 21, 1967; Assigned General Motors Corp., Detroit, Mich.

The present invention relates to a combination spark plug and combustion sensor and more particularly to such a sensor which is suitable to determine the nature of combustion events within the combustion chamber of an internal combustion (IC) engine. Such sensors can be used to determine if the combustion is normal or abnormal, for example resulting in knocking or pinging of the engine.

BACKGROUND

Optical sensors have previously been proposed to sense the course of a combustion event occurring within the combustion chamber of an IC engine, to determine therefrom the course of pressure variation arising upon combustion of an air-fuel mixture. Some such sensors utilize a housing similar to a spark plug, and which may be combined with or formed part of a spark plug, for insertion into the engine block of the IC engine, through a suitable tapped opening. The referenced application No. 214,481, the disclosure of which is hereby incorporated by reference, describes a type of such a sensor.

Combining an optical sensor with a spark plug has substantial advantages, since no special openings need be formed in the cylinder head of the IC engine, and standard arrangements may therefore be used. It is only necessary to provide a dual connection to the so-constructed plug, one for the electrical supply to transmit ignition to transmit ignition energy to the spark plug portion of the combination and one to connect an optical light guide to provide for optical sensing of combustion phenomena arising in the cylinder of the IC engine. In order to conduct electrical energy to the spark gap in such combined sensors, it has been proposed to surround a glass rod, forming the optical pickup, typically a quartz glass rod, with a metalicsleeve, surrounding the glass rod. In the arrangements, the glass rod was threaded through the opening of the metalic sleeve.

It has been found that this arrangement is expensive to manufacture since the metalic sleeve is very long with respect to the diameter of the opening therein, resulting in difficulties of insertion of the glass rod. In mass production conditions, during insertion of a glass rod into the opening of a sleeve having a large length-to-diameter ratio, problems with centering of the opening in the metal sleeve or tube arise. If the opening within the sleeve, which, essentially, is a long tube, is not perfectly aligned and centered, the glass rod may break. Additionally, it is difficult to secure a thin glass rod within a small opening in such a metal tube or sleeve so that it is securely held therein while, also, being seated and sealed therein so that combustion gasses, under the high pressures which arise during explosion and combustion of the fuel-air mixture will not leak out from the side of the glass tube.

The referenced German Patent Disclosure Document describes a spark plug which includes a resistor made of a heterogeneous mixture of conductive materials, so that the spark plug, inherently, is a "resistor" type plug forming its own radio noise suppression element.

THE INVENTION

It is an object of the present invention to provide a combined spark plug-optical sensor combination which is readily manufactured even under mass production conditions.

Briefly, the metalic elements which conduct ignition energy from the electrical terminal to the sparking end portion of the combination are formed as two separate metal elements which surround the glass rod; one of the metal elements is in the form of a metal sleeve made of high temperature resistant material, and extending over only a limited portion of the length of the glass rod. This is the sleeve or metalic element which actually is introduced into the combustion chamber of the IC engine, that is, which is, or carries the sparking terminal. The other metal element is in the form of an electrical connection with a metal sleeve and the outer electrical terminal, and provided to transfer electrical energy between the outer terminal or connector and the high temperature resistant metal sleeve at the combustion chamber end of the combination. This second metalic element is so constructed that, in association with the light guide formed by the glass rod, it does not introduce bending or radial stresses on the glass rod.

In accordance with a feature of the invention, the second metalic element is a packing of electrically conductive powder, which is held in position and in electrical contact with the first metalic element, forming the sparking end terminal, by a compression spring or the like which, itself, can provide for transfer of electrical energy from the outer terminal to the packing or powder. The electrical resistance of this packing or powder can be so controlled that the spark plug portion of the combination forms a resistor-plug.

In accordance with another feature of the invention, the glass rod is surrounded, as before, by the first metalic element and the second metalic element is a tube which is placed around the glass rod, but mechanically separate from the first one, and may be of different material, so that it need not have the dimensions and structural characteristics of the first metalic element which also forms the spark tip. Preferably, the second metalic element ensures sealing of the glass rod; it can be sealed in a second metal tube in accordance with an embodiment of the invention, and/or into the terminal connector which also provides for electrical ignition energy. By providing an adhesive at the end of glass rod which is remote from the combustion chamber, the glass rod is sealed with respect to combustion pressures and, additionally, the location of the adhesive seal is such that it will be at the cool side of the spark plug, so that adhesives can be used which have only mediocre high-temperature resistance characteristics, and which, therefore, are substantially less expensive than high-temperature adhesives.

DRAWINGS

FIG. 1 is a schematic half section longitudinal view, half side view of a spark plug-sensor combination; and FIG. 2 is a view similar to FIG. 1, showing another embodiment.

DETAILED DESCRIPTION

Figure 1:
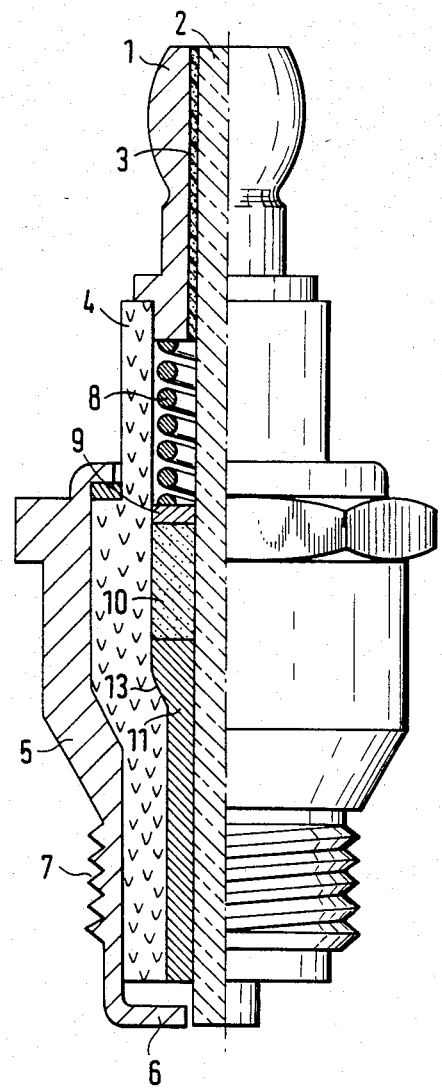

The combined sensor-spark plug of FIG. 1 has a metal connecting terminal 1 provided to conduct electrical energy thereto. A glass rod 2 is located within the center of the spark plug, extending from the combustion chamber end of the combination out to the other, or free end thereof. The glass rod 2 is adhesively connected by a casting compound 3 to the connecting terminal 1. The connecting terminal 1 is secured to an insulator 4 by a thread (see FIG. 2) or by a press fit, by adhesion, or cement, or a combination thereof. The insulator 4 is held in a metal housing 5 which is formed with a ground, or chassis electrode 6 at the combustion chamber end of the spark plug. The housing 5 is formed with a thread 7 so that the combination can be screwed into a suitably tapped opening of the engine block of an IC engine (not shown).

Arranged, in sequence, and starting from the combustion chamber end, the following components are located within the insulator 4:

A sleeve 11, formed of high-temperature material, preferably steel, nickel-chromium steel, or pure nickel; preferably, the sleeve 11 in form of a tube has an enlarged upper end 13, forming an upper bearing surface.

A packing 10 made of electrically conductive powder. The packing 10 may be a powder of aluminum oxide mixed with aluminum powder, copper powder, graphite, or the like.

A washer 9, of metal, forming a pressure plate and holding the powder packing 10 in position, surrounding the glass rod, and packed within a central opening of the insulator 4.

A compression spring 8, resiliently pressing against the washer 9 and the terminal conductor 1, and additionally providing for transfer of electrical energy between the terminal connector 1, the washer 9, and hence through the packing 10 to the sleeve or tube 11.

OPERATION

Ignition energy connected to the connecting terminal 1 is conducted via the compression spring 8, pressure plate or pressure washer 9, packing 10, to the actual ignition electrode in form of the sleeve 11, which is positioned to be opposite the ground or chassis electrode 6. The compression spring 8 elastically maintains the combination formed of the washer 9, packing 10 and sleeve 11 in position. Packing 10 acts as a seal of the combination with respect to the combustion gasses which occur, under high pressure, within the combustion chamber of an IC engine with which the spark plug is to be used. Additional sealing is obtained by the casting compound 3 securing the glass rod 2 in position in the terminal 1.

Upon assembly, no special centering of the glass rod over an extended distance is necessary, since the ignition sleeve 11 surrounds the glass rod for only a short range or distance of its length-that is, short with respect to the overall length from tip to tip of the spark plug-sensor combination. Assembly of the remaining elements 1, 3, 8, 9, 10 can be carried out in accordance with routine assembly of spark plugs under mass production conditions, without taking special care regarding the centering of the glass rod 2; any errors, or tolerances which might result in radial loading due to out-of-center positions of openings within the insultor 4, the terminal 1 and the like are readily compensated.

The packing 10, preferably, includes a heat resistant powder, such as talcum, spinel, or the like, the electrical conductivity of the packing 10 being determined by appropriate addition of graphite, copper powder, aluminum powder and aluminum oxide, for example. In accordance with a feature of the invention, the proportion of additive of metal to the packing powder is so controlled that a finite, predetermined electrical resistance will be obtained for the packing 10. Thus, the packing 10 will then have the function of the radio noise suppression resistor, so that no additional suppression resistors are needed when such plugs are used in an ignition system, thus providing for transfer of high ignition energy directly to the plug.

EMBODIMENT OF FIG. 2

Rather than using a single metal tube surrounding the glass rod 1, as was customary in accordance with the prior art, a combination of two metalic elements is provided. The spark end of the spark plug is again formed by a sleeve 11, similar to sleeve 11 of FIG. 1. Additionally, a metal tube 12 is provided, seated in a recess of the tube 11, and shorter than the length of the glass rod, of course, by about the length of the tube 11. The shorter metal tube 12 surrounds the portion of the glass rod 2 remote from the combustion chamber. The tube 12 need not be a material which is highly temperature resistant; other materials, for example those with only low heat resistance characteristics can be used. The glass rod 2 is adhered within the tube 12 at the side remote from the combustion chamber with an adhesive or casting compound 3.

To assemble such a sensor, the elements 1, 12, 11 are sequentially assembled around the glass rod 2. Since the respective elements are shorter than the entire length of the glass rod, no radial loading on the glass rod will occur even if there should be tolerance errors in size or centering of the openings within the respective tubes or sleeves 11, 12.

Figure 2:
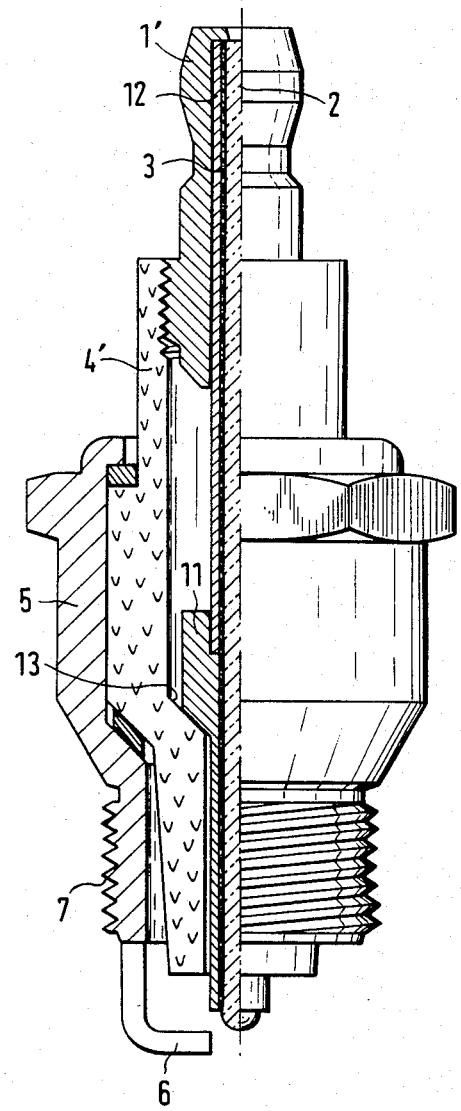

The glass rod is held in position by the adhesive or cement 3; in accordance with a feature of the invention, which is equally applicable to the embodiment of FIG. 1, the terminal 1' of FIG. 2 can be formed with a partial overlap at the end around the glass rod.

The spark carrying sleeve 11 is preferably conically enlarged at its inner end as seen at 13 (FIG. 1) which has a conical seating surface, fitting against a similar shoulder or seating surface 13' formed in the insulator. Additional sealing can be obtained by extending the contact surfaces between the sleeve 11 and the insulator.

The insulator 4 can be formed, as desired, such that it engages the sleeve 11 (FIG. 1) or surrounds the sleeve 11 with slight clearance; likewise, it can taper towards the end to leave a breathing space or clearance space at the inner end with respect to the metal housing 5. Reference is made to the copending application Ser. No. 428,003, filed Sept. 29, 1982, assigned to the assignee of the present application, entitled "COMBINATION SPARK PLUG AND COMBUSTION PROCESS SENSOR" (claiming priority of the German Application P No. 31 47 291.5 Nov. 28, 1981, regarding adjustment of the respective clearance diameters to control the temperature characteristics of the spark plug-sensor combination.

For example, the insulator 4' (FIG. 2), formed with a thread to receive the thread of the electrical terminal connector 1' may, equally, be used with a similar connector in the embodiment of FIG. 1.

Various changes and modifications may be made in the features described in connection with any one of the embodiments may be used with any of the others, within the scope of the inventive concept.

A suitable material for the tube 12 is aluminium, unalloyed steel or any other material with low thermal expansion coefficient, this coefficient being in the same order of magnitude as that of the glass rod 2. The inner diameter of tube 12 is approximately the same as that of tube 11, thus allowing easy centering of the glass rod 2 even under mass production assembly conditions. The glass rod 2 is held by adhesive 3 throughout tubes 11 and 12.

We claim:

1. Combined spark plug and optical combustion sensor with a glass rod light guide and means for reducing mechanical stress thereon, having
   a metal housing (5) formed with a central opening therein;
   an insulator (4) located in the central opening of the housing and formed with a central bore;
   a glass rod (2) centrally located in the bore and serving as a light guide along the length of the combination for light resulting from combustion;
   an electrical terminal connector (1) secured to the insulator (4) at a first end portion of the combination and forming a connection end; and
   means to conduct electrical energy to the second end portion of the combination,
   wherein said means for reducing stress comprises, in accordance with the invention,
   a casting compound (3) surrounding the glass rod (2) at least in the region of the terminal connector (1) and providing a pressure-tight seal between the terminal connector (1) and the glass rod (2); and
   'two metal elements surrounding the glass rod (2), one (11) of said metal elements forming a metal sleeve of high temperature resistant material and extending over only a limited range of the length of said glass rod at said second end position; and
   the other metal element (8,9,10; 12) being in electrical connection with said metal sleeve (11) and transferring electrical energy between said connector and said metal sleeve, while leaving the glass rod unaffected by radial or bending stresses.

2. Sensor according to claim 1 wherein the other metal element comprises a packing (10) formed of electrically conductive powder, in electrically connecting relation to said metal sleeve, and packed within the central bore of the insulator;
   a pressure plate (9) bearing on said powder, remote from the metal sleeve;
   and a compression spring (8) positioned between the pressure plate and the terminal connector, and resiliently pressing against the pressure plate and hence against said packing to maintain the packing in compacted condition, surrounding the glass rod, and bearing against the metal sleeve, while conducting electrical energy between the terminal connector, the packing, and hence the metal sleeve.

3. Sensor according to claim 2 wherein said packing (10) comprises a mixture of metal powder and powder having insulating properties to form a packing of predetermined resistance, whereby the combined spark plug and combustion sensor will have resistor-spark plug characteristics.

4. Sensor according to claim 1 wherein the second metal element comprises a metalic sleeve (12) electrically connected to the electrical terminal connector (1) and the metal sleeve of high temperature resistant material (11).

5. Sensor according to claim 1 wherein said casting compound comprises adhesive properties.

6. Combined spark plug and optical combustion sensor with a glass rod light guide and means for reducing mechanical stress thereon, having
   a metal housing (5) formed with a central opening therein;
   an insulator (4') located in the central opening of the housing and formed with a central bore;
   a glass rod (2) centrally located in the bore;
   an electrical terminal connector (1') secured to the insulator (4') at a first end portion of the combination and forming a connection end and formed with an overlapping rim, overlapping, in part, the glass rod (2) at the connection end; and
   means to conduct electrical energy to the second end portion of the combination,
   wherein said means for reducing stress comprises, in accordance with the invention,
   a casting compound (3) surrounding the glass rod (2) at least in the region of the terminal connector (1) and providing a pressure-tight seal between the terminal connector (1) and the glass rod (2); and
   two metal elements surrounding the glass rod (2), one (11) of said metal elements forming a metal sleeve of high temperature resistant material and extending over only a limited range of the length of said glass rod at said second end position; and
   the other metal element (8,9,10; 12) being in electrical connection with said metal sleeve (11) and transferring electrical energy between said connector and said metal sleeve, while leaving the glass rod unaffected by radial or bending stresses.

7. Sensor according to claim 1 wherein the insulator (4') is formed with a threaded portion at the connection end, and the electrical terminal connector (1') is formed with a thread engaging the threaded portion of the insulator.

8. Sensor according to claim 6, wherein the insulator (4') is formed with a threaded portion at the connection end, and the electrical connector (1') is formed with a thread engaging the threaded portion of the connector.

9. Combined spark plug and optical combustion sensor with a glass rod light guide and means for reducing mechanical stress thereon, having
   a metal housing (5) formed with a central opening therein;
   an insulator (4) located in the central opening of the housing and formed with a central bore;
   a glass rod (2) centrally located in the bore and serving as a light guide along the length of the combination for light resulting from combustion;
   an electrical terminal connector (1) secured to the insulator (4) at a first end portion of the combination and forming a connection end; and
   means to conduct electrical energy to the second end portion of the combination,
   wherein said means for reducing stress comprises, in accordance with the invention, a casting compound (3) surrounding the glass rod (2) at least in the region of the terminal connector (1) and providing a pressure-tight seal between the terminal connector (1) and the glass rod (2); and two metal elements surrounding the glass rod (2), one (11) of said metal elements forming a metal sleeve (11) of high temperature resistant material and extending over only a limited range of the length of said glass rod at said second end position; and the other metal element (12) being an electrically conductive material with a low thermal expansion coefficient of the same order of magnitude as that of the glass rod (2) and transferring electrical energy between said connector (1) and said metal sleeve (11), while leaving the glass rod unaffected by radial, bending, or thermal expansion stresses.

10. Sensor according to claim 9, wherein the terminal connector is formed with an overlapping rim, overlapping, in part, the glass rod at the connection end.

11. Sensor according to claim 2, wherein said insulator is formed with a threaded portion at the connection end, and the electrical terminal connector is formed with a thread engaging the threaded portion of the insulator.

12. Sensor according to claim 3, wherein said insulator is formed with a threaded portion at the connection end, and the electrical terminal connector is formed with a thread engaging the threaded portion of the insulator.

13. Sensor according to claim 4, wherein said insulator is formed with a threaded portion at the connection end, and the electrical terminal connector is formed with a thread engaging the threaded portion of the insulator.

14. Sensor according to claim 5, wherein the terminal connector is formed with an overlapping rim, overlapping, in part, the glass rod at the connection end.

15. Sensor according to claim 2, wherein said casting compound has adhesive properties.

16. Sensor according to claim 3, wherein said casting compound has adhesive properties.

17. Sensor according to claim 7, wherein said casting compound has adhesive properties.

18. Sensor according to claim 8, wherein said casting compound has adhesive properties.

19. Sensor according to claim 9, wherein said casting compound has adhesive properties.

* * * * *